UNITED STATES PATENT OFFICE.

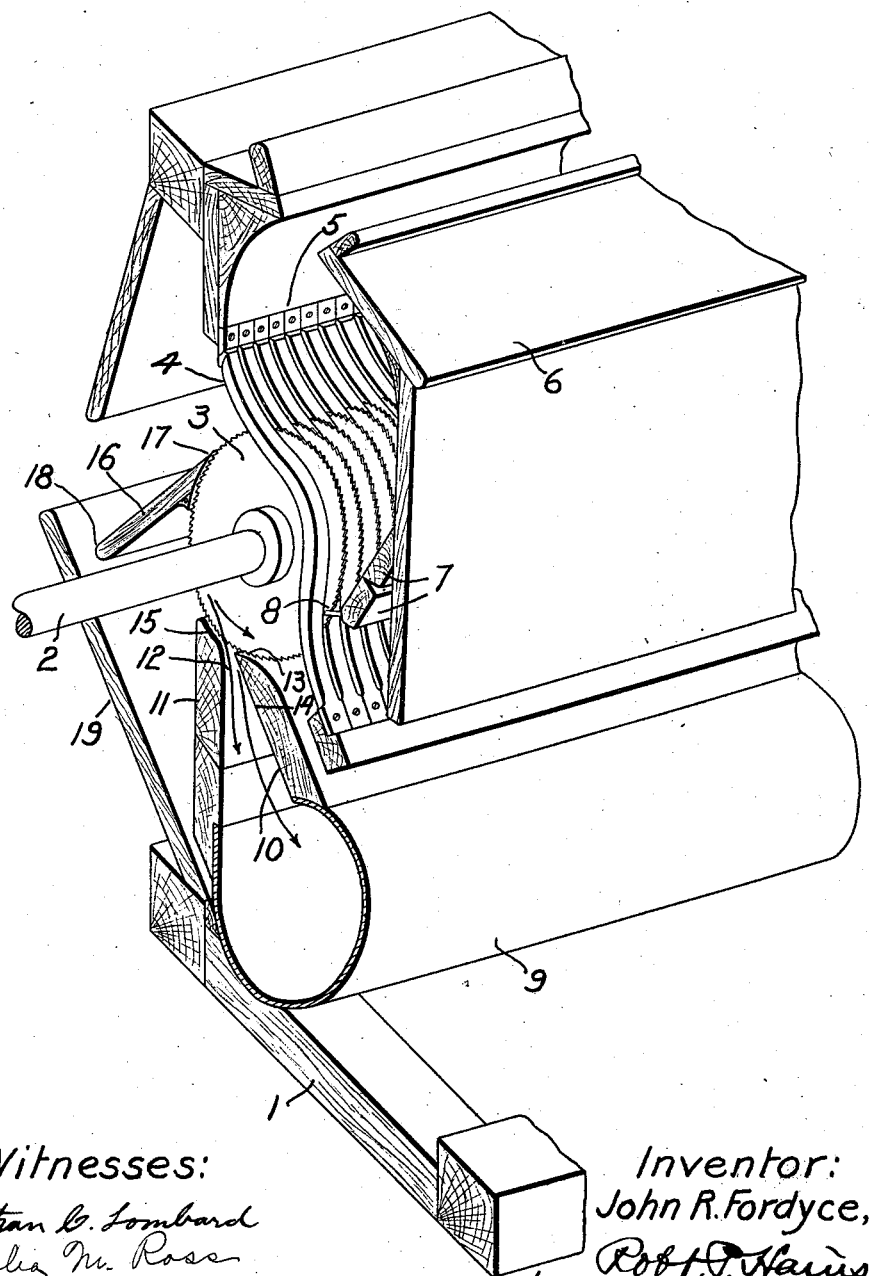

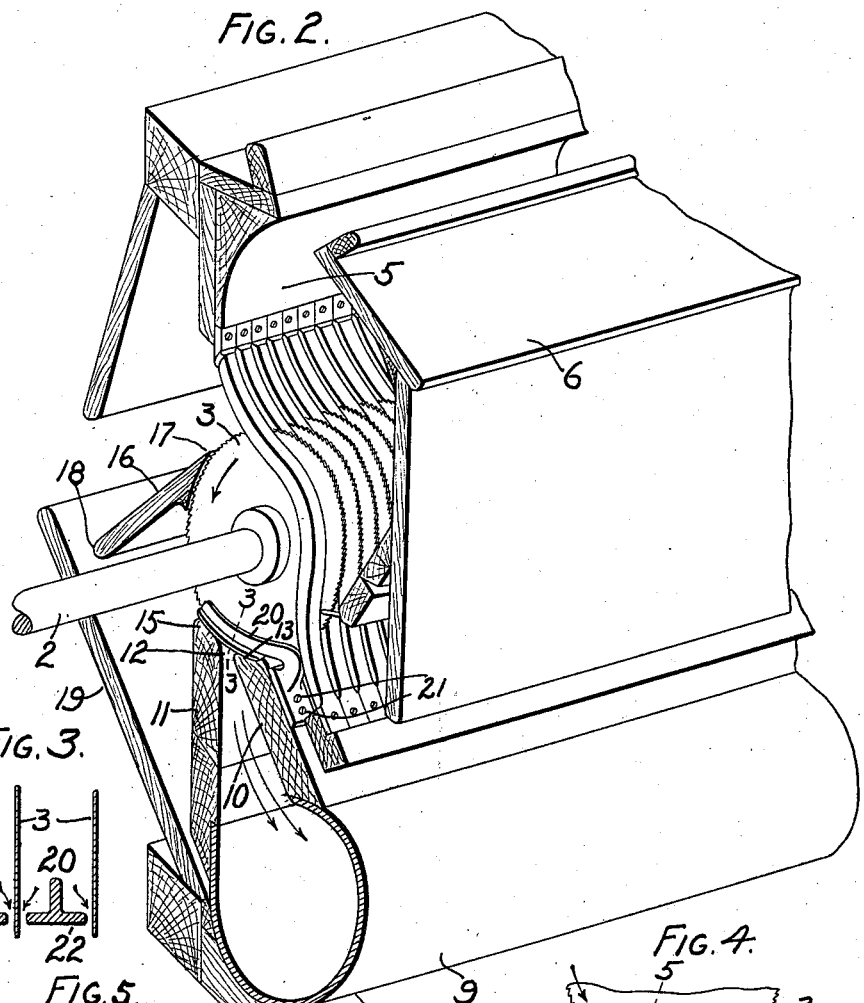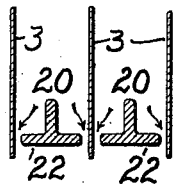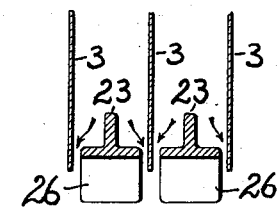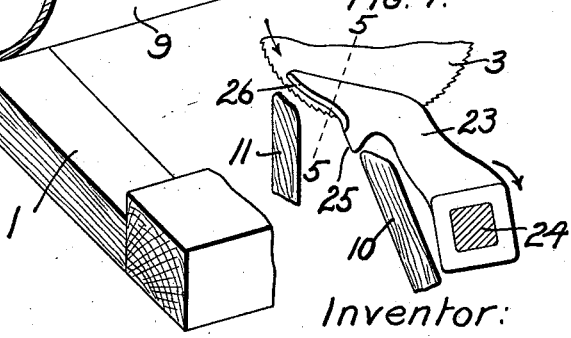

JOHN R. FORDYCE, OF LITTLE ROCK, ARKANSAS.

COTTON-GIN.

1,028,701.

Specification of Letters Patent.   Patented June 4, 1912.

Application filed May 14, 1909.   Serial No. 495,838.

*To all whom it may concern:*

Be it known that I, JOHN R. FORDYCE, a citizen of the United States, residing at Little Rock, in the county of Pulaski and State of Arkansas, have invented an Improvement in Cotton-Gins, of which the following description, in connection with the accompanying drawings, is a specification, like letters on the drawings representing like parts.

The invention to be hereinafter described relates to cotton gins and more particularly to the means for removing the cotton from the saws and separating the motes and cotton.

As well known by those skilled in the art, it has been common to remove the cotton from the saw teeth by means of brushes, or blasts of air directed more or less across the face of the saws. These have been open to various objections, well known by those skilled in the art, and many attempts have been made to overcome such defective action. Among these attempts, the prior air blasts have been replaced by air suction devices, but owing to the peculiar action of induced air currents and absence of proper nozzle formation suitable to the management of suction currents, these attempts have met with only partial success.

The aims and objects of the present invention are to provide means and to so relatively dispose the elements thereof with respect to the saws that the recognized merits of suction or vacuum produced air currents may be rendered available for effectively removing the cotton from the saws free from motes and other impurities.

With these generally stated objects in view, the invention consists of the parts, elements, and combinations hereinafter more fully described in connection with the accompanying drawings of a form or embodiment of the invention.

In the drawing: Figure 1 is a perspective view of a simple form of saw gin embodying the present invention, parts being broken away to more clearly show the relation of elements beyond; Fig. 2 is a similar view showing the suction nozzle provided with removing or air fingers extending between the saws; Fig. 3 is a detail in cross-section on line 3—3, Fig. 2, showing one form of fingers which causes the induced air currents to move along the sides of the saws to more effectually remove the cotton therefrom; Fig. 4 is a detached detail of a modified form of the removing fingers and a supporting bar by which they may be turned upward; and Fig. 5 is a cross-section on line 5—5, Fig. 4.

In the drawings, 1 is a suitable supporting frame for the working parts and may be of any usual or desired character for sustaining the saw shaft 2, which carries a series of saws 3, which, as usual, extend between the ribs 4 into the roll box 5 formed between the ribs 4 and the front casing 6.

The parts thus far described, as well as the support 7 at the lower end of the roll box, and the teeth 8, are or may be all as usual or of any desired character.

It is essential for proper results and clean product that not only the saws be fully cleared of their load of cotton each time they make a revolution, so as not to tear or injure the fiber by repeated drawing between the saw ribs, but that all trash, hulls, and other waste constituting the motes be effectively removed from the cotton before the latter is finally taken from the saws and conveyed to the usual condenser.

Disposed below the saws 3 is a vacuum chamber or conduit 9 connected to any usual or desired form of vacuum producing means, such as a fan, or like device, which, being well known, need not be further described. Extending upward from the vacuum chamber 9 are the walls 10 and 11 which gradually contract or approach toward their upper ends to form a relatively contracted opening or suction nozzle 12 closely adjacent the periphery of the saws.

As well understood by those skilled in the art, the saws themselves produce a current of air by their rapid rotation. To check this saw induced current and render it effective in conjunction with the vacuum produced currents in removing the cottom from the saws, the lip 13 of the nozzle is extended to an approximate point or edge adjacent the saw teeth and in opposition to the direction of saw teeth movement so that it acts as a dam or deflector for such saw induced currents, the inclined surface 14 of the nozzle then directing said saw induced currents into the nozzle and vacuum chamber. Simultaneously with this action of the lip 13 and inclined surface 14, the suction currents seek to enter the contracted opening 12 of the nozzle and, traveling over the face of the saws and in the direction of saw movement, strip the cotton from the saw teeth, which at the time have their cotton engaging edges or faces approximately vertical, over the contracted opening of the nozzle. It will be noted that the suction nozzle is disposed below the saws, that is, at a point below the tops of the saws though not necessarily underneath; that the wall 13 forms a lip or dam across the saw induced currents to check the same and deflect them into the nozzle at the under side of the saws; that gravity at this time is best disposed to assist in stripping the cotton from the downwardly extending faces of the saw teeth; and that the suction currents rushing over the faces of the saws and in the direction of saw movement into the contracted opening 12 of the nozzle, assisted by centrifugal action, combine to thoroughly clean the saws of cotton. The top 15 of the other wall 11 of the nozzle preferably has a portion thereof close to the saws for some distance and its forward portion curved outwardly about their periphery so that the inrushing currents, as indicated by Fig. 1, are held up close to the saw teeth and caused to act effectively in stripping the cotton therefrom during the greatest velocity and volume of the suction currents which will be over the top of the nozzle wall or top 15.

As hereinbefore noted, it is essential that the motes and other waste material be removed from the cotton prior to its passing under the control of the suction currents and into the nozzle on its way to the condenser, and to this end there is provided a mote-board 16, the forward edge 17 of which is in close proximity to the upper portion of the saws where they emerge from between the ribs 4, and inclines downwardly and backwardly therefrom, as indicated in Fig. 1. It will thus be seen that the mote-board 16 is disposed above the suction nozzle and that its rear edge 18 extends well back therefrom, the effect being that as the motes travel down the mote-board 16 and drop from the rear edge 18 thereof onto the incline 19 by which they are directed to any desired form of mote conveyer, the suction currents passing between the edge 18 of the mote-board and the inclined chute 19 are not sufficiently strong to draw the motes along with them into the suction nozzle. At the same time the mote-board being disposed above the suction nozzle and to the rear thereof eliminates the motes as they are thrown from the saws by centrifugal force.

While the construction thus far described is effective and economical in operation, and while in practice it effectually cleans the saws of the cotton by the combined action of the suction currents, centrifugal action, gravity, and the deflected saw induced currents, as hereinbefore pointed out, and due to the disposition of the nozzle beneath the saws and the relations of the lips thereof to the saws, as described, it may be found desirable at times to provide additional means to deflect the air currents close to the edge of the saws and such currents induced by the vacuum in the vacuum chamber pass over the face of the saws. As one means of accomplishing this result, there is secured to a suitable support a series of fingers 20, as indicated in Fig. 2, said fingers being extended between the saws and serving to deflect the air currents, as indicated in Fig. 3, toward the face of the saws, as such currents pass downward into the suction nozzle. In the form of invention shown by Fig. 2, these fingers 20, preferably formed of metal, are secured by suitable screws 21 to the nozzle wall 10, although, as will be obvious, they might be secured to any other suitable or convenient support. As indicated in Fig. 3, these fingers 20 are preferably formed as an inverted T, the lateral flanges 22 of the fingers being extended toward the saws 3, as indicated in Fig. 3, and partially closing the space between the saws. The effect is that the currents, indicated by the arrows, Fig. 3, are directed against the face of the saws as the said currents pass into the suction nozzle, thereby producing the strongest and most effective air velocity over that portion of the saws from which the cotton is to be removed. The fingers 20, of course, extend between the saws directly over the contracted opening 12 of the suction nozzle, the walls 10 and 11 of said suction nozzle being formed substantially as already described, so that the currents of air passing over the wall 11, as well as the currents of air passing about the flanges 22, act with maximum effect upon the teeth of the saws to remove the cotton therefrom.

The fingers 20 may be formed variously, as will be obvious, and may be supported so as to be capable of turning upward when, for any purpose, it is desired to clean the faces thereof, or for other reasons. As one form of such modified construction, Fig. 4 shows the fingers 23 mounted upon a bar 24 which may be supported so as to turn in the direction of the arrow, Fig. 4. The fingers 23 in this modified form of construction not only extend between the saws, as hereinbefore indicated, but they may each have a downwardly projecting deflector 25 which may enter or partially enter the contracted nozzle opening, as indicated in Fig. 4, the construction being such that should any bunch of cotton remain fixed to the saw teeth or fail to be disengaged therefrom by the induced suction currents and their co-acting forces, as the saw teeth pass over the nozzle entrance, such deflector 25 will engage the undetached bunch of cotton and strip it from the saws, as will be obvious. The modified form of fingers 23 have also the lateral flanges as 26 to induce the downwardly traveling air currents into close contact with the face of the saws, as indicated in Fig. 5. These portions 26 or webs are preferably cut away as they approach the point or deflector 25 to cause a greater blast of air to be concentrated on the point which will remove any cotton that may have accumulated on the fingers.

In all the forms of the invention herein described, and regardless of whether the fingers be employed or not, and regardless of the character of these fingers, it will be noted that the suction currents act upon the saws at a point below the top of the saws and preferably at a point most favorable for the effectual removal of the cotton owing to the action of gravity and the fact that the teeth are pointed downward at such time. By thus locating the suction nozzle, also, and removing the motes from the top portion of the saws by centrifugal action, and directing the motes well to the rear, it will be seen that the cotton thus detached from the saws is clean and free from waste.

Obviously, changes in details might be made within the true scope of the present invention, and the form and relation of parts be altered to suit the conditions of use within the spirit of the present invention.

What is claimed is:

1. In a saw gin, the combination of a series of saws, a suction nozzle having a contracted opening disposed in close proximity to the saw teeth for directing currents along the face of the saws and removing cotton from the saws, one wall of the nozzle having a top portion extending peripherally along a portion of the saws, a vacuum chamber in communication with said nozzle, and a mote receiver disposed back of the saws to catch motes ejected from the saws by centrifugal action.

2. In a saw gin, the combination of a series of saws, a suction nozzle having a contracted opening disposed in close proximity to the saw teeth to direct suction currents over the saw teeth and remove cotton therefrom and direct it into the nozzle, the top of one of the nozzle walls being extended peripherally about a portion of the saws, a vacuum chamber communicating with the suction nozzle, and a mote catcher disposed back of the saws and above the nozzle to receive motes discharged from the saws by centrifugal action and direct the same back of the saws out of the influence of the suction currents.

3. In a cotton gin employing air suction means for the removal of cotton from the saws, the combination of a series of saws, a suction nozzle disposed adjacent the saws and having the top of one of its walls close to and extending about a portion of the periphery of the saws to cause increased velocity of the suction currents in the direction of saw movement and its opposite wall forming a dam for the saw induced currents to direct the same into the nozzle, and a vacuum chamber connected to said suction nozzle.

4. In a vacuum cotton gin, the combination of a series of saws, a suction nozzle having a contracted opening disposed below the top of the saws, a suction chamber in communication with said suction nozzle, the top of the nozzle wall toward the rear of the saws extending close to and peripherally about a portion of the saws, and a mote board disposed above the suction nozzle to receive motes discharged from the saws by centrifugal action and direct the same back of the saws and out of the influence of the suction currents.

5. In a vacuum cotton gin, the combination of a series of saws, a suction nozzle disposed below the saws and in close proximity thereto for removing cotton from the saw in the direction of saw movement, and an inclined mote board having its upper end in close proximity to the tops of the saws, and its lower end directing the motes to the rear of the suction nozzle and out of the influence of the suction currents.

6. In a vacuum cotton gin, the combination of a series of saws, a suction nozzle disposed adjacent the saws with its opening in close proximity to the periphery of the saws, and a series of fingers extending over the opening of the suction nozzle and having side portions to direct the suction currents into close relation with the faces of the saws as said currents pass toward the suction nozzle opening.

7. In a cotton gin employing air suction means for the removal of cotton from the saws, the combination of a series of saws, a suction nozzle disposed below the saws and having the top of one of its walls close to and extending along a portion of the periphery of the saws to cause increased velocity of the suction currents in the direction of saw movement, a series of fingers projecting between the saws over the nozzle opening, and a vacuum chamber connected to said suction nozzle.

8. In a cotton gin employing air suction means for the removal of cotton from the saws, the combination of a series of saws, a suction nozzle disposed below the saws and having the top of one of its walls close to and extending along a portion of the periphery of the saws to cause increased velocity of the suction currents, a series of fingers projecting between the saws and having side portions to direct the suction currents against the saws, and a vacuum chamber connected to said suction nozzle.

9. In a cotton gin, the combination of a series of saws, a suction nozzle having its opening disposed adjacent the saws and in close proximity thereto for removing cotton from the saws, a series of fingers extending between the saws and having a deflecting portion projecting toward the nozzle opening, and a vacuum chamber in communication with said nozzle.

10. In a cotton gin, the combination of a series of saws, a suction nozzle having its opening disposed below the saws and in close proximity thereto for removing cotton from the saws, a series of fingers extending between said saws and mounted to be turned upward away from the nozzle opening, and a vacuum chamber in communication with said nozzle.

11. In a cotton gin, the combination of a series of saws, a suction nozzle having its inlet opening adjacent the peripheries of the saws and below the axis thereof, the wall of said nozzle last approached by the saw teeth as they pass the nozzle opening being provided with a sharp lip, and a vacuum chamber communicating with said nozzle.

In testimony whereof, I have signed my name to this specification, in the presence of two subscribing witnesses.

JOHN R. FORDYCE.

Witnesses:
WILL L. TERRY, Jr.,
R. E. BISHOP.

Copies of this patent may be obtained for five cents each, by addressing the "Commissioner of Patents, Washington, D. C."